(12) United States Patent
Arsenault et al.

(10) Patent No.: US 6,988,848 B2
(45) Date of Patent: Jan. 24, 2006

(54) DRIP BERM HAVING HYDROPHOBIC AND HYDROCARBON RETENTIVE PROPERTIES

(75) Inventors: Kirk J. Arsenault, Winfield (CA); Michael Howard Boudreau, Salmon Arm (CA)

(73) Assignee: Roadstead Technologies Inc., Winfield (CA)

( * ) Notice: Subject to any disclaimer, the term of this patent is extended or adjusted under 35 U.S.C. 154(b) by 0 days.

(21) Appl. No.: 10/826,760

(22) Filed: Apr. 16, 2004

(65) Prior Publication Data

US 2004/0208703 A1 Oct. 21, 2004

Related U.S. Application Data

(60) Provisional application No. 60/320,114, filed on Apr. 16, 2003.

(51) Int. Cl.
*C02F 1/40* (2006.01)
*B32B 3/02* (2006.01)

(52) U.S. Cl. .......................... 404/39; 404/35; 180/69.1; 220/571; 220/641

(58) Field of Classification Search ............ 404/34–41; 428/57, 119, 137; 180/69.1; 220/571, 573, 220/641
See application file for complete search history.

(56) References Cited

U.S. PATENT DOCUMENTS

| | | | |
|---|---|---|---|
| 4,468,910 A * | 9/1984 | Morrison .................... | 52/591.2 |
| 4,484,661 A | 11/1984 | Evenson | |
| 4,684,562 A * | 8/1987 | Hartkemeyer ............... | 428/182 |
| 4,875,537 A | 10/1989 | Garnatz et al. | |
| 5,020,638 A | 6/1991 | Smith | |
| 5,224,792 A * | 7/1993 | Hagenah ...................... | 404/39 |
| 5,478,625 A * | 12/1995 | Wright ........................ | 428/119 |
| 5,797,698 A * | 8/1998 | Barth et al. .................. | 404/39 |
| 5,834,385 A | 11/1998 | Blaney et al. | |
| 5,928,751 A | 7/1999 | Van Romer et al. | |
| 5,948,250 A * | 9/1999 | Middleton ................... | 210/232 |
| 5,957,241 A * | 9/1999 | Anderson .................... | 184/106 |
| 6,258,430 B1 * | 7/2001 | Perlman ....................... | 428/57 |
| 6,446,275 B1 | 9/2002 | Wright et al. | |
| 6,471,440 B1 * | 10/2002 | Scheiwiller .................. | 404/39 |
| 6,558,769 B1 * | 5/2003 | Chwala ........................ | 428/137 |

FOREIGN PATENT DOCUMENTS

GB 2206275 A * 1/1989

* cited by examiner

*Primary Examiner*—Meredith Petravick
*Assistant Examiner*—Alexandra Pechhold
(74) *Attorney, Agent, or Firm*—Antony C. Edwards

(57) ABSTRACT

A drip berm for mounting onto a drip mat includes one or more inner berm members and one or more cooperating outer berm members. Each inner berm member is mountable contiguously around the circumferential edges of the drip mat. Each outer berm member is mountable along an inner edge of the outer berm member contiguously along or around an outer edge of, or perimeter of a frame formed by the inner berm member or members. Each inner berm member includes at least one clamp member for mounting onto the circumferential edges of the drip mat. Each clamp member includes a pair of jaws for mounting inwardly of the circumferential edges of the drip mat. The jaws are pivotable about a clam-shell hinge so as to, in a closed position, engage and clamp the circumferential edges of the drip mat between the pair of jaws, and so as to, in an open position, release the circumferential edges of the drip mat from between the pair of jaws. The outer berm members cooperate, when mounted onto the inner berm members, to lock the pair of jaws in the closed position.

13 Claims, 12 Drawing Sheets

DRIP BERM HAVING HYDROPHOBIC AND HYDROCARBON RETENTIVE PROPERTIES

CROSS REFERENCE TO RELATED APPLICATION

This application claims priority from U.S. Provisional Patent Application No. 60/320,114 filed Apr. 16, 2003 entitled Drip Berm Having Hydrophobic and Hydrocarbon Retentive Properties.

FIELD OF THE INVENTION

This invention relates to a framework for retaining a replaceable mat having specific hydrophobic and hydrocarbon retentive properties, and in particular to a berm frame which securely retains the mat by clamping the edges of the mat between a set of clamshell-like jaws that interlock with edge trim forming a berm around the mat.

BACKGROUND OF THE INVENTION

Ultrasonically bonded melt-blown polypropylene material such as is manufactured by Spilltech Industries Inc. and marketed as WOB 1250 or QPB K50K Oil Only Pads™ are in use in industrial applications for quick clean up of petroleum and chemical spills. Such material has a capacity for the selective retention of hydrocarbons yet has hydrophobic qualities, which allows unimpeded through water flow without unwanted hydrocarbon migration.

Use of such material is ideal as a mat to trap small amounts of accidentally spilled hydrocarbon based liquids at either a commercial or residential site to enhance safety due to slippage, and protect the environment. For example, it may be utilized as a floor covering in vehicle service bays, at locations where vehicles are parked, such as bus and taxi stands, in commercial kitchen facilities where cooking oil is handled, or at other locations where small amounts of such liquids may be expected to be spilled.

The use of a mall mat of such material as a floor or ground covering without being secured within a frame has been found to be generally impractical. The mat is subject to accidental movement from its intended place of use, either as the site is being cleaned up, by foot traffic, or by air currents such as wind. The mat alone cannot be easily secured in place on an asphalt or concrete slab.

In the prior art the application is aware of U.S. Pat. No. 5,834,385 which reveals a mat having an exterior comprising hydrophobic, liquid permeable material enclosing an inner layer of absorbent material. This product primarily absorbs oil spilled on water and retains absorbed oil only inside the absorbent material within the mat.

In addition, applicant is also aware of U.S. Pat. No. 5,928,751 which describes a drip berm having separate upper and lower areas. The upper area accepts an oil retaining pad. The lower area contains granular anchoring material. The oil-retaining pad is retained within the upper area by means of a screen.

In addition, applicant is also aware of U.S. Pat. No. 5,020,638 which describes a vehicle liquid drip catching system composed of a tray receptacle and an absorbent pad retained within the tray.

In addition, applicant is also aware of U.S. Pat. No. 6,446,275 which describes a surface protection system mat consisting of a cartridge top, and absorbent core, and a base unit. The top is perforated to allow spilled liquids to drain into the absorbent core.

In addition, applicant is also aware of U.S. Pat. No. 4,875,537 which describes a disposable oil absorbent drip pad assembly for a vehicle consisting of a bottom layer of a metallic screen material and a top layer of oil absorbent material, bound peripherally by a fiberglass channel.

In addition, applicant is also aware of U.S. Pat. No. 4,484,661 which describes a drip pan for vehicles that can be used individually or assembled with an array of pans to catch drippings from parked vehicles.

In addition, applicant is also aware of U.S. Pat. No. 6,258,430 which describes a portable parking mat and berm which secures the absorbent mat by a snap together frame that retains the mat by a variety of means.

SUMMARY OF THE INVENTION

The present invention provides a frame into which a mat having specific hydrophobic and hydrocarbon retentive properties may be securely retained. The mat receiving frame clamps the perimeter of the mat using a clamp-like mechanism. Retentive teeth may be provided that piercingly engage the mat fabric and retain it within the frame. In one embodiment, the frame which may be interlocked with like frames in order to cover a larger area with the framed mat. The perimeter edge of the frame may be contoured gently inwardly and upwardly, from the bottom surface to the top surface, to minimize impact by cleaning equipment or foot traffic against the perimeter edge and reduce accidental repositioning or movement of the mat and frame.

The objects of this invention may be achieved in whole or in part by a frame for removably retaining a commercially available mat, the mat manufactured from materials which are designed to absorb and retain hydrocarbons and allow water to pass through.

The frame may be manufactured by way of example from polypropylene plastic formed into hinged clamps with barbed surfaces to engage and retain the mat material at its perimeter.

The clamps include means to engage adjacent clamps or edge trim. This allows multiple sections of mat and frames to be co-joined to cover larger areas than a single mat. The edge trim finishes the frame with a sloped surface that improves egress onto and off of the mat.

The mat and frame of the present invention works in combination with the pad, clamps, trim, and the assembled whole may be secured to a floor or other receiving surface by screws, bolts or the like fasteners, for example using apertured tabs mounted to each corner of the mat and frame.

In summary, the drip berm according to the present invention, being adapted for mounting onto a drip mat having circumferential edges extending contiguously around the circumference thereof, includes one or more inner berm frame members and one or more cooperating outer berm frame members. Each inner berm frame member, herein also referred to as an inner berm member, is mountable contiguously around the circumferential edges of the drip mat. Each outer berm frame member, herein also referred to as an outer berm member, is mountable along an inner edge of the outer berm member contiguously along or around an outer edge of, or perimeter of a frame formed by the inner berm member or members.

Each inner berm member includes at least one clamp member for mounting onto the circumferential edges of the drip mat. Each clamp member includes a pair of jaws for mounting inwardly of the circumferential edges of the drip mat. The jaws are pivotable about a clam-shell hinge so as to, in a closed position, engage and clamp the circumferential edges of the drip mat between the pair of jaws, and so as to, in an open position, release the circumferential edges of the drip mat from between the pair of jaws. The outer berm members cooperate, when mounted onto the inner berm members, to lock the pair of jaws in the closed position. The clamp member may be co-extensive with the inner berm member.

A rigid flange is mounted to each jaw of the pair of jaws so as to extend in oppositely disposed relation to each jaw. The hinge is disposed so as to provide a fulcrum between each jaw and its corresponding flange. Each flange has a first locking means disposed on its corresponding outer perimeter. The inner edge of each outer berm member has a second locking means thereon for interlocking mating with the first locking means. The first locking means on each flange cooperates with each other when the pair of jaws are in the closed position so as to releasably interlock with the second locking means. When the cooperating first locking means, that is the first locking means on each jaw are cooperatively aligned with each other, and so may be releasably interlocked with the second locking means, then the pair of jaws may be locked in the closed position by the interlocking of the first and second locking means.

In one embodiment, the first locking means may include at least one first male mating member and at least one first female receiver, and the second locking means may include at least one second male mating member and at least one second female receiver. In this embodiment the first male mating member mates with the second female receiver and the second male mating member mates with the first female receiver. For example, the first and second locking means may be dove-tail shaped male members forming dove-tail shaped female receivers therebetween. The at least one first male mating member, the at least one first female receiver, the at least one second male mating member, and the at least one second female receiver may be each co-extensive spaced arrays of the male mating members and female receivers. The dove-tail shaped male members may be co-extensive spaced arrays of dove-tail shaped male members for forming a continuous dove-tail joint between the inner and outer berm members.

Advantageously, the inner berm members are also mountable back-to-back to each other so as to oppositely dispose corresponding pairs of jaws. The first locking means on a first of the inner berm members are mountable to the first locking means on a second of the inner berm members in the back-to-back pair of inner berm members so as to lock the pair of jaws on the first and second inner berm members in the closed position, whereby the drip berm may be expanded to form a larger frame to cover a larger area with a plurality of drip mats mounted in the expanded frame.

Further advantageously, the inner and outer berm members, when mounted to each other, form, in lateral cross-section, a smoothly contoured profile rising upwardly from the inner edge of the inner berm member and from the outer edge of the outer berm member.

DETAILED DESCRIPTION OF EMBODIMENTS OF THE INVENTION

Figure 1:
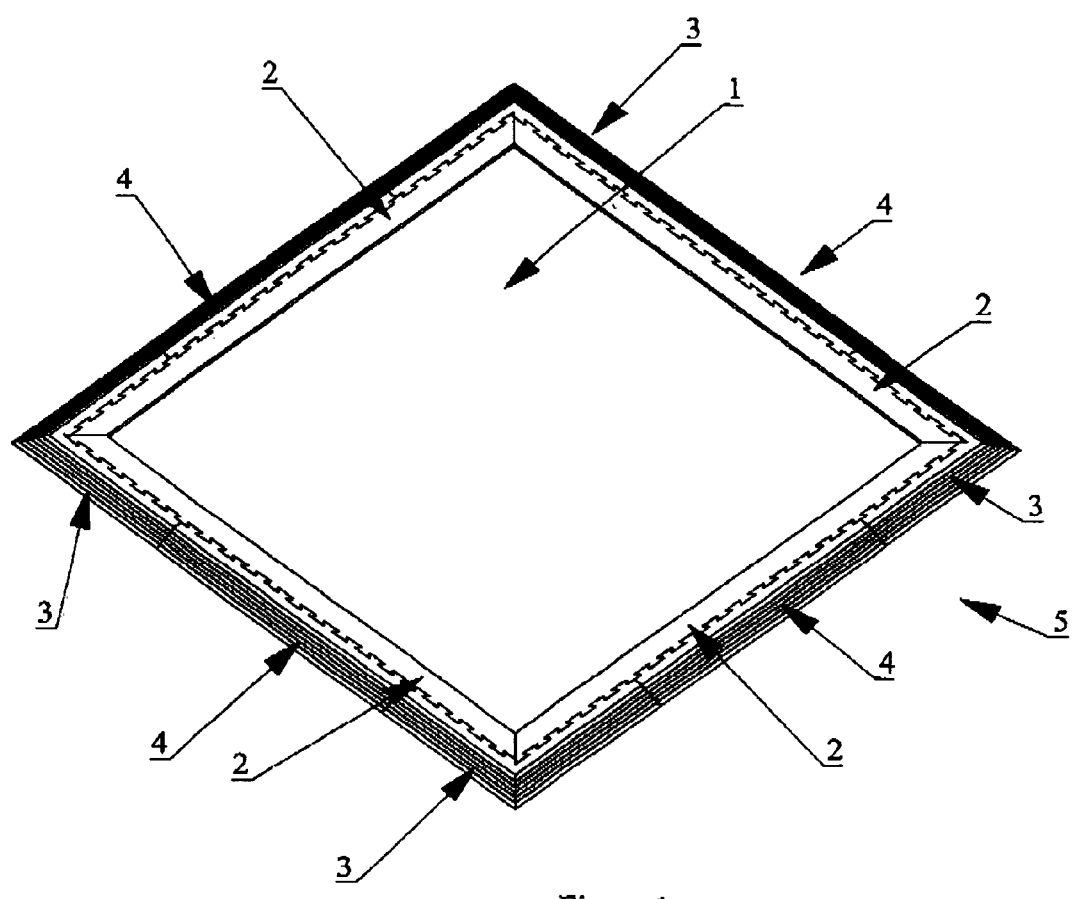
FIG. 1 is a perspective view of the mat and frame assembly with mat, clamps, and trim of the present invention.
Figure 2:
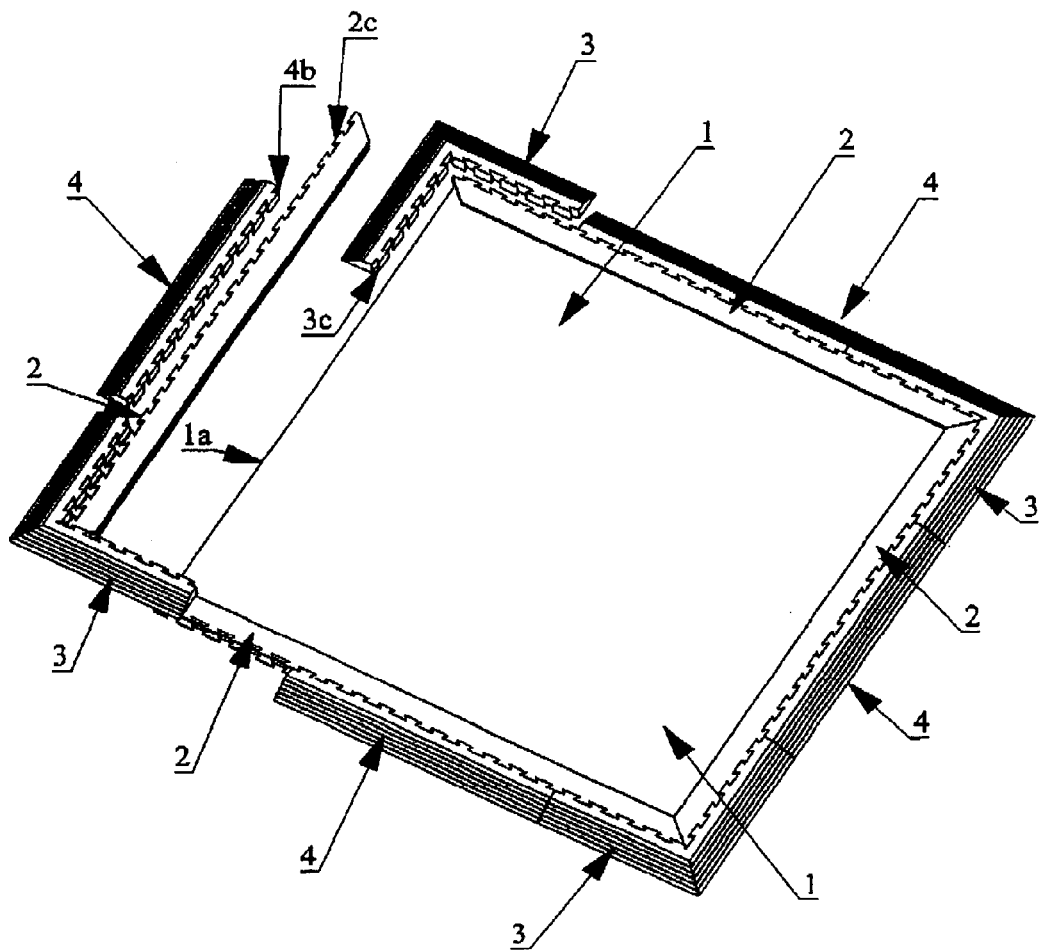
FIG. 2 is a partially exploded perspective view of the mat and frame with some of the trim removed.
Figure 3:
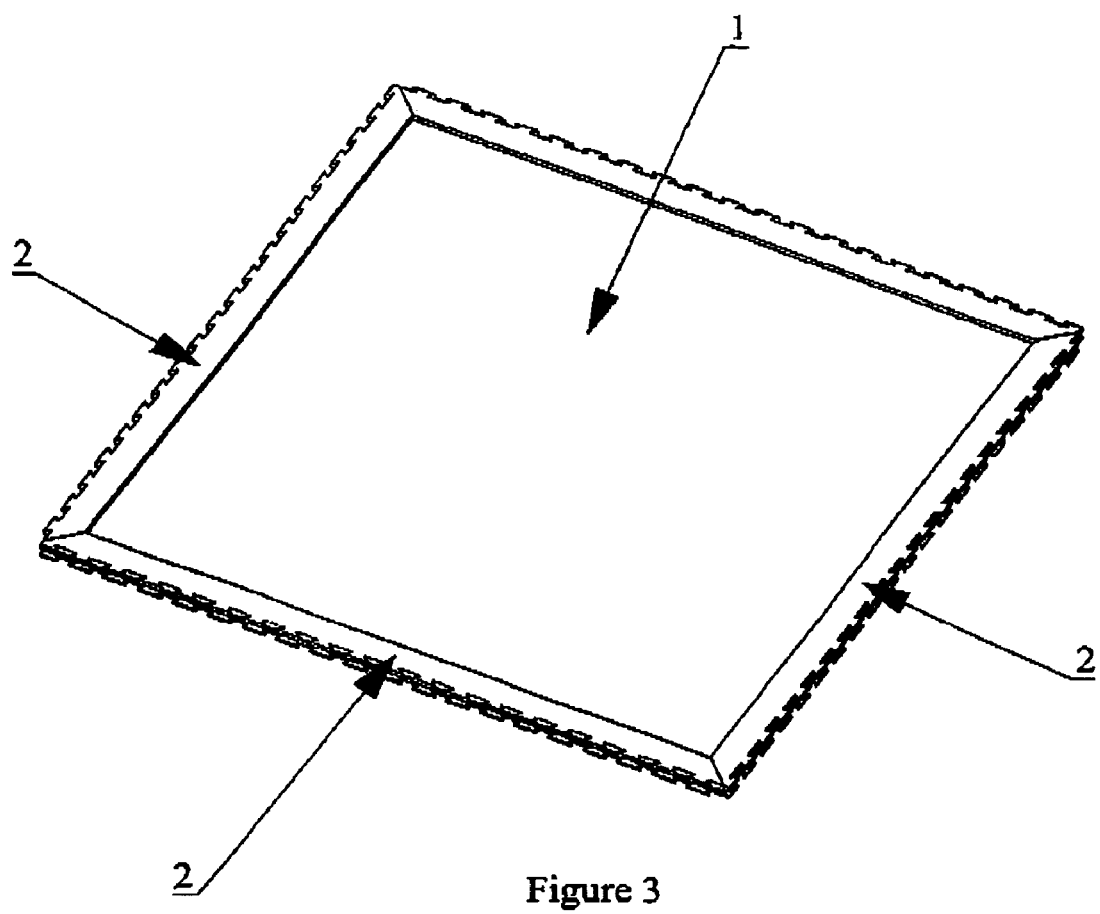
FIG. 3 is a perspective view of the mat and frame without trim attached.
Figure 4:
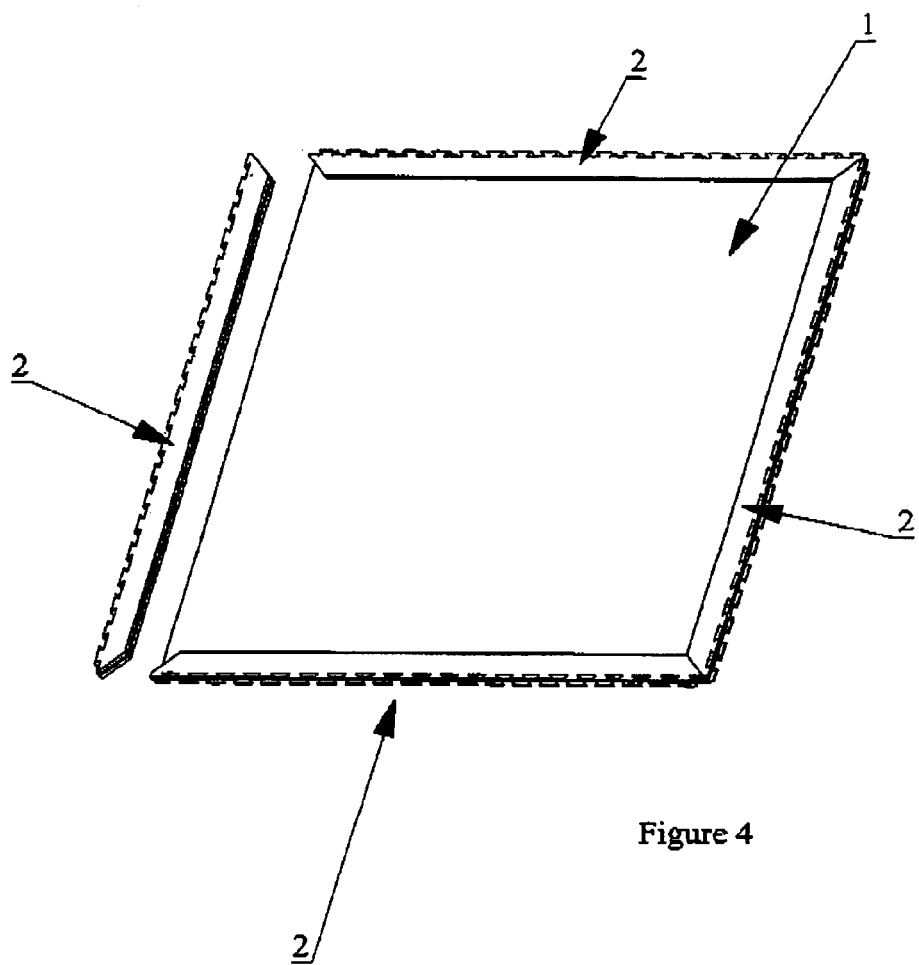
FIG. 4 is a perspective partially exploded view of the mat and frame with one clamp removed.

With reference to the drawing figures wherein similar characters of reference denote corresponding parts in each view, the mat frame assembly 5 secures a hydrophobic, hydrocarbon retentive mat 1 within a berm formed by clamps 2 positioned around the perimeter of the mat 1. The berm primarily functions to retain and locate the mat in a position for desired use.

Figure 5:
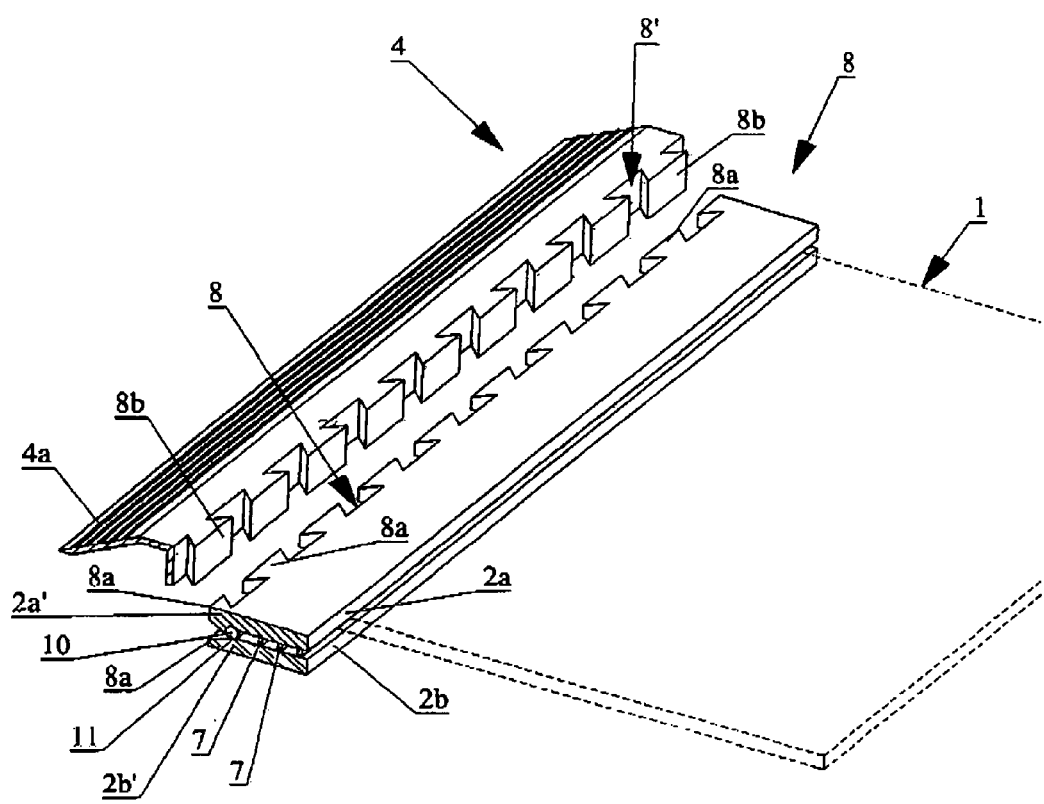
FIG. 5 is a perspective view of a section of a closed clamp.

In instances of single mat use the clamps 2 are locked and finished with corner trim 3 and edge trim 4 by engaging said clamps and trim components using dove tail connections 8. In particular, as seen in FIG. 5, male dove tail members 8a on the upper and lower halves 2a and 2b respectively of clamp 2 interlock in the female spaces or slots between male dove tail members 8b on edge trim 4, and male dove tail members 8b interlock in the female spaces or slots between male dove tail members 8a on both the upper and lower halves 2a and 2b of clamp 2. Male dove tail members 8b extend, when so mated, so as to mate with both the upper and lower halves 2a and 2b of clamp 2 so as to prevent clamp 2, shown in its closed position in FIG. 5, from opening into its open position of FIG. 6. Thus mat 1 may be securely retained by teeth 7 between the upper and lower halves 2a and 2b of clamped 2 when in its closed position.

Figure 9:
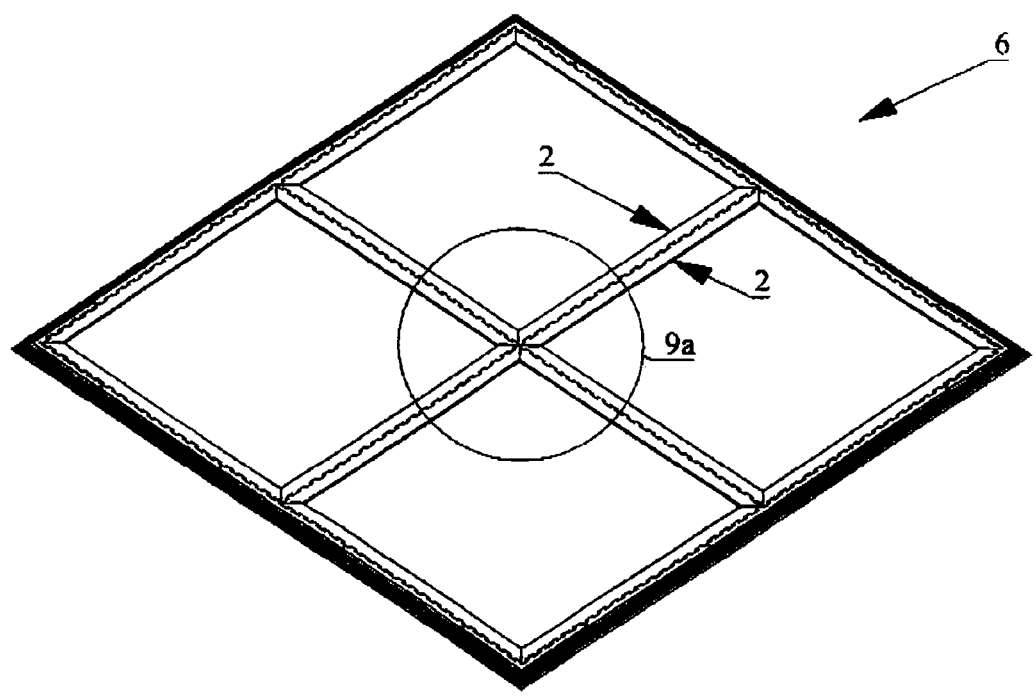
FIG. 9 is a perspective view of 4 interlocked mat and frames.

In instances of multiple mat use the clamps 2 are locked by and adjoining clamp by engaging the dovetails of each clamp when positioned back to back as shown in FIG. 9. The outer perimeter of the multiple mat assembly is secured by engaging the dovetails 8 of trim 3 and 4 with the clamps 2.

Figure 6:
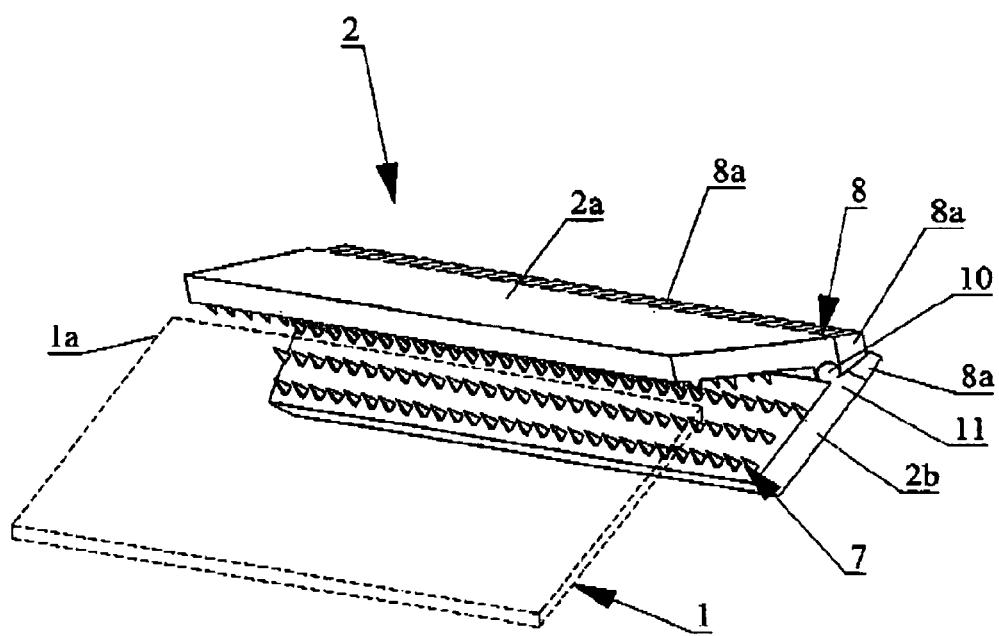
FIG. 6 is a perspective view of an open clamp.
Figure 7:
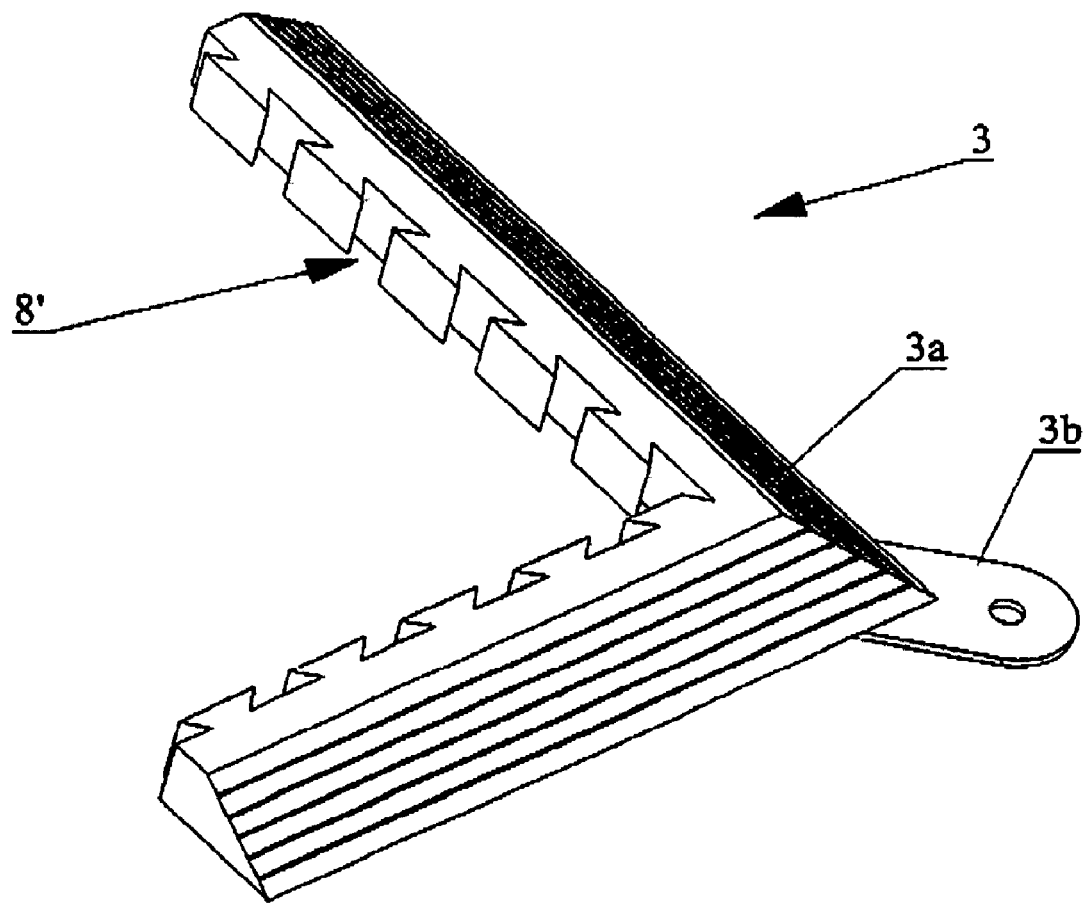
FIG. 7 is a perspective view of the corner trim of the present invention.
Figure 8:
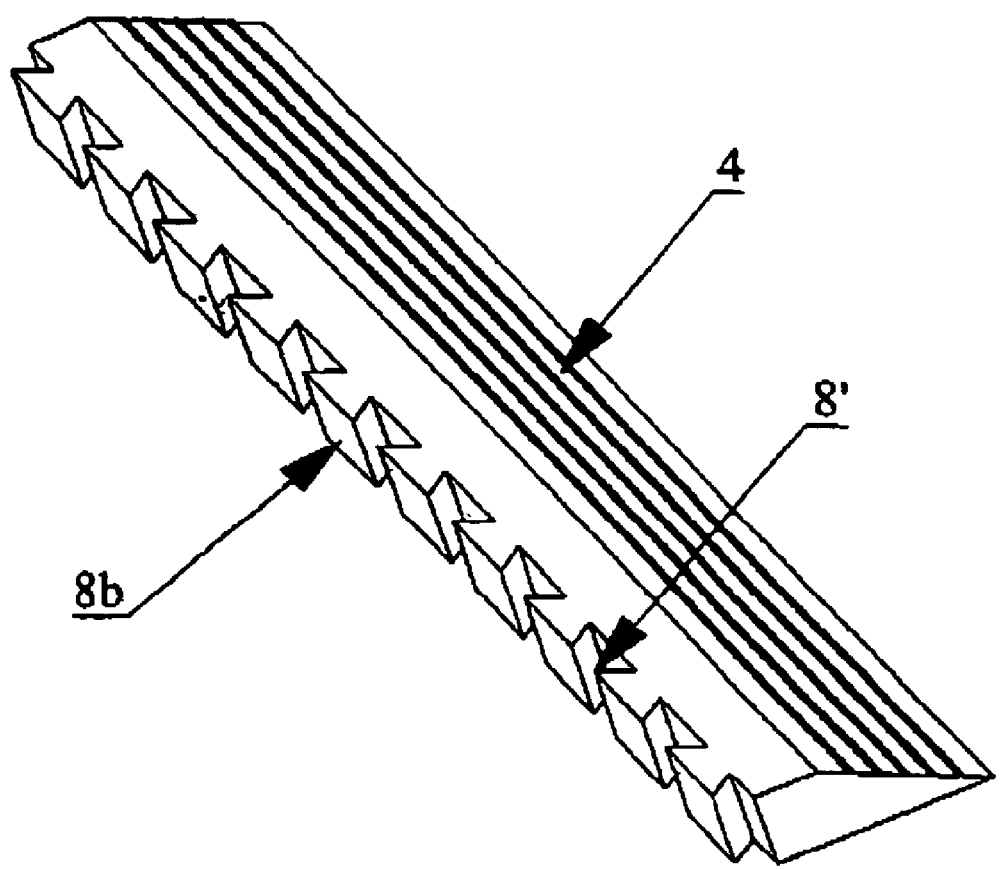
FIG. 8 is a perspective view of the side trim of the present invention.

Clamp 2 is hinged about elongate hinge 10 so that upper and lower halves 2a and 2b may rotate about hinge 10 between the closed position of FIG. 5 and the open position of FIG. 6. Clamp 2 opens to accept the edge 1a of the mat 1. Both upper and lower halves 2a and 2b of the clamp contains rows of teeth 7 as best seen in the open clamp of FIG. 6. Teeth 7 perforate and engage the edge 1a of mat 1 when the clamp is closed. Each clamp is locked closed by the dove tail mating of either an adjoining clamp 2 or a trim component 3 or 4 into the corresponding dove tail slots 8 on both the clamp and the adjoining clamp or trim component.

The trim components 3 and 4 are outwardly sloped down and contain dovetail slots 8 on its inside vertical surface that mate with the dovetail slots on the outside vertical surface of the clamp 2. The trim locks the chimp when installed so as to retain the hydrocarbon retentive mat 1. Further, the trim components may be fastened to a substrate surface by lag screws or similar fasteners (not shown) to fix the mat and frame assembly in a specific location.

Thus as may be readily understood, frame 5 may be manufactured by way of example from polypropylene plastic formed into hinged clamps 2 with barbed surfaces such as teeth 7 on the gripping surfaces of the clamps to engage and retain mat 1 along its perimeter edge 1a.

The clamps 2 include means such as dove tail slots 8 to engage adjacent clamps 2 or edge trim components 3 or 4. This allows multiple sections of mat and frame assemblies 5 to be co-joined such as seen in FIG. 9 to cover larger areas than a single mat. The edge trim components 3 and 4 finish the frame with a sloped surface, 3a and 4a respectively, that improves, egress onto and off of the mat.

The mat and frame may be secured to a floor or other receiving surface by screws, bolts or the like fasteners, for example using apertured tabs 3b mounted to each corner of the mat and frame assembly 5.

The drip berm according to the present invention, for example frame assembly 5, is thus adapted for mounting onto drip mat 1 having circumferential edges 1a extending contiguously around the circumference thereof. The drip berm includes one or more inner berm frame members such as clamps 2 and one or more cooperating outer berm frame members such as trim component 3 or 4. The inner berm frame members are mountable contiguously around the circumferential edges 1a of drip mat 1. The outer berm frame members are mountable along an inner edge of the outer berm members, such as inner edge 4b of trim 4 and inner edge 3c of trim 3, contiguously along or around an outer edge of, or perimeter of a frame formed by the inner berm member or members such as outer perimeter edge 2c of clamps 2.

Each inner berm member includes at least one clamp member, such as clamp 2, for mounting onto the circumferential edges 1a of drip mat 1. Each clamp member includes a pair of jaws, such as upper and lower halves 2a and 2b of clamp 2, for mounting inwardly of the circumferential edges of the drip mat. The jaws are pivotable about a clam-shell hinge, such as hinge 10, so as to, in a closed position, engage and clamp the circumferential edges of the drip mat between the pair of jaws, and so as to, in an open position, release the circumferential edges of the drip mat from between the pair of jaws. The outer berm members cooperate, when mounted onto the inner berm members, for example by mating of dove tail slots 8 and 8' and male dove tail members 8a and 8b, to lock the pair of jaws in the closed position.

A rigid flange is mounted to each jaw of the pair of jaws so as to extend in oppositely disposed relation to each jaw. In the illustrated embodiments, the pair of jaws are the upper and lower halves 2a and 2b of clamps 2, and the corresponding rigid flanges are the flanges 2a' and 2b' supporting the male dove tail members 8a extending from hinge 10. Thus hinge, such as hinge 10, is disposed so as to provide a fulcrum 11 between each jaw (for example clamp halves 2a and 2b) and its corresponding flange (for example flanges 2a' and 2b'). Each flange has a first locking means disposed on its corresponding outer perimeter. For example, in the illustrated embodiments the first locking means are the dove tail members 8a and the dove tail slots 8 between dove tail members 8a. The inner edge of each outer berm member has a second locking means thereon (for example dove tail slots 8' and dove tail members 8b) for interlocking mating with the first locking means. The dove tail slots 8 on each clamp halve 2a and 2b cooperates with each other when the clamp 2 is in the closed position so as to releasably interlock dove tail slots 8 with the dove tail slots 8' between dove tail members 8b. When the cooperating slots 8 on clamp halves 2a and 2b are aligned with each other, they are releasably interlocked with slots 8' between dove tail members 8b so as to lock clamp 2 in the closed position.

The first locking means may be characterized as including in one embodiment at least one first male mating member in the form of dove tail members 8a and at least one first female receiver in the form of dove tail slots 8, and the second locking means may be characterized as including at least one second male mating member in the form of dove tail members 8b and at least one second female receiver in the form of dove tail slots 8'. In this embodiment the first male mating member mates with the second female receiver and the second male mating member mates with the first female receiver. For example, the first and second locking means may be dove-tail shaped male members forming dove-tail shaped female receivers therebetween. The at least one first male mating member, the at least one first female receiver, the at least one second male marina member, and the at least one second female receiver may be each co-extensive spaced arrays of the male mating members and female receivers. The dove-tail shaped male members may be co-extensive spaced arrays of dove-tail shaped male members for forming a continuous dove-tail joint between the inner and outer berm members.

Figure 9A:
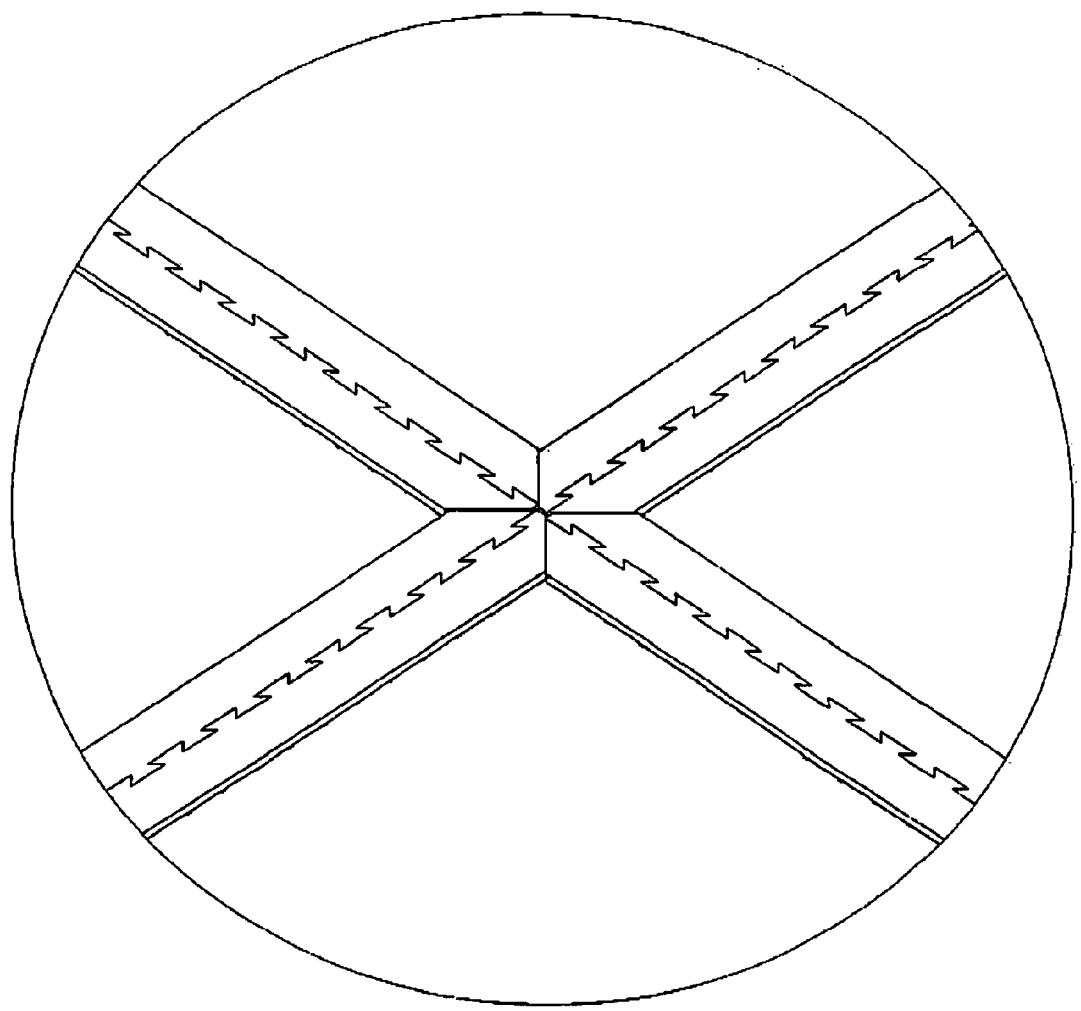
FIG. 9a is an enlarged view of FIG. 9.
Figure 10:
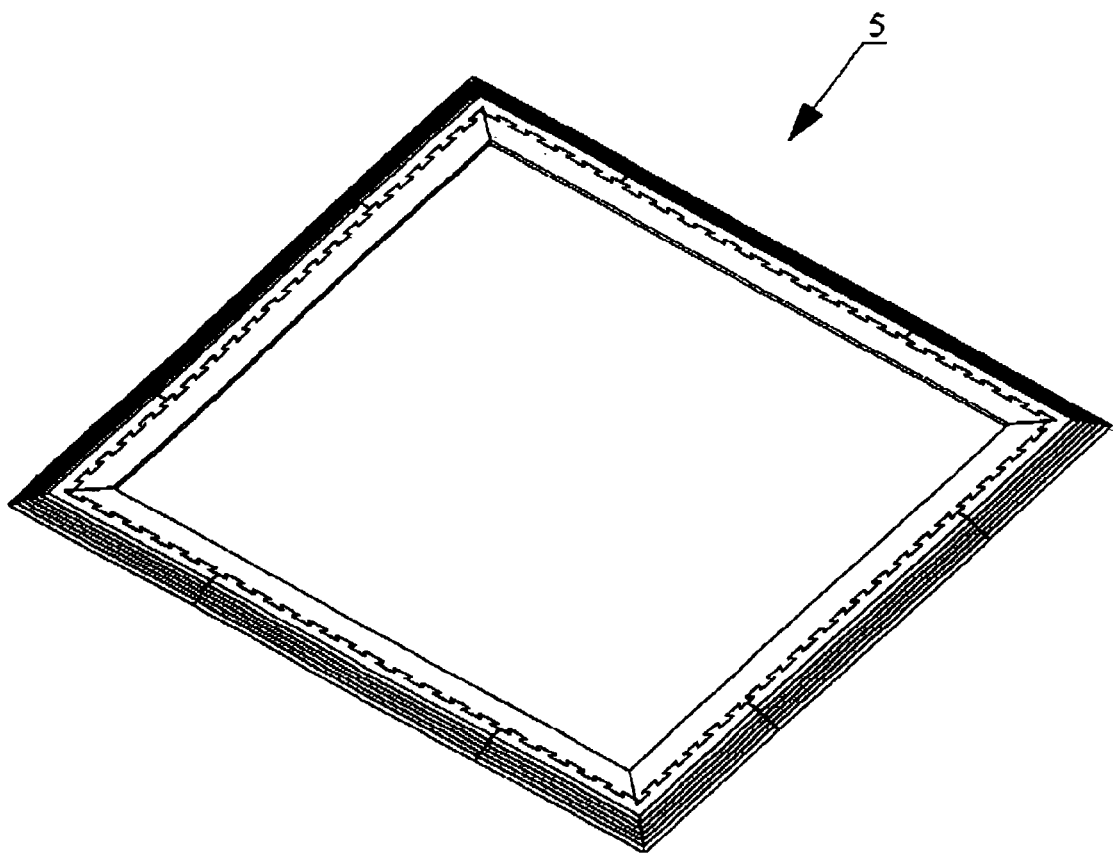
FIG. 10 is a shaded perspective view of the mat and frame assembly.
Figure 11:
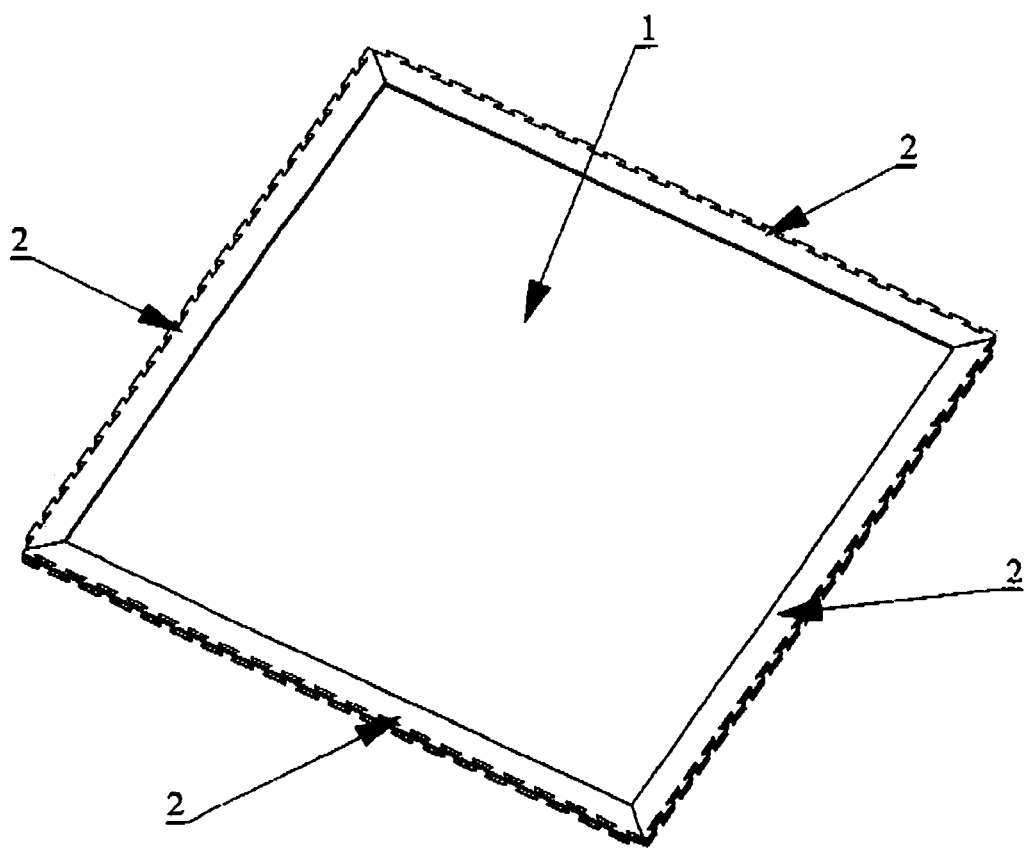
FIG. 11 is a shaded perspective view of the mat and frame without trim.

In an embodiment of the inner berm members are also mountable back-to-back to each other so as to oppositely dispose corresponding pairs of jaws. The first locking means on a first of the inner berm members are mountable to the first locking means on a second of the inner berm members in the back-to-back pair of inner berm members such as seen in FIG. 9a so as to lock the pair of jaws on the first and second inner berm members in the closed position. In this fashion the drip berm may be expanded to form a larger frame to cover a larger area with a plurality of drip mats mounted in the expanded frame.

What is claimed is:

1. A drip berm mountable onto a drip mat having circumferential edges extending contiguously around the circumference thereof, the drip berm comprising:

an inner berm member mountable contiguously around said circumferential edges, an outer berm member mountable along an inner edge thereof contiguously around an outer perimeter of said inner berm member, said inner berm member including at least one clamp member for mounting onto the circumferential edges of the drip mat, said at least one clamp member having a pair of jaws for mounting inwardly of said circumferential edges and pivotable about a clam-shell hinge so as to, in a closed position, engage and clamp said circumferential edges between said pair of jaws, and so ass to, in an open position, release said circumferential edges from between said pair of jaws, a rigid flange mounted to each jaw of said pair of jaws so as to extend in oppositely disposed relation to said each jaw, said hinge disposed so as to provide a fulcrum between said each jaw and a corresponding said flange, each said flange having a first locking means disposed on said outer perimeter, said inner edge of said outer berm member having a second locking means thereon for interlocking mating with said first locking means, said first locking means on each said flange cooperating with each other when said pair of jaws are in said closed position so as to releasably interlock with said second locking means and when said cooperating first locking means so releasably interlocked with said second locking means said pair of jaws locked in said closed position.

2. The drip berm of claim 1 wherein said first locking means is at least one first male mating member and at least one first female receiver and wherein said second locking means is at least one second male mating member and at least one second female receiver, and wherein said first male mating member mates with said second female receiver and said second male mating member mates with said first female receiver.

3. The drip berm of claim 2 wherein said first and second locking means are dove-tail shaped male members forming dove-tail shaped female receivers therebetween.

4. The drip berm of claim 1 wherein a plurality of said inner berm members are also mountable back-to-back to each other so as to oppositely dispose corresponding said pairs of jaws, said first locking means on a first of said plurality of said inner berm members mountable to said first locking means on a second of said plurality of said inner berm members so as to lock said pair of jaws on said first and second of said plurality of said berm members in said closed position, whereby said drip berm may be expanded to cover a larger area with the drip mats.

5. The drip berm of claim 2 wherein a plurality of said inner berm members are also mountable back-to-back to each other so as to oppositely dispose corresponding said pairs of jaws, said first locking means on a first of said plurality of said inner berm members mountable to said first locking means on a second of said plurality of said inner berm members so as to lock said pair of jaws on said first and second of said plurality of said inner berm members in said closed position, whereby said drip berm may be expanded to cover a larger area with the drip mats.

6. The drip berm of claim 3 wherein a plurality of said inner berm members are also mountable back-to-back to each other so as to oppositely dispose corresponding said pairs of jaws, said first locking means on a first of said plurality of said inner berm members mountable to said first locking means on a second of said plurality of said inner berm members so as to lock said pair of jaws on said first and second of said plurality of said inner berm members in said closed position, whereby said drip berm may be expanded to cover a larger area with the drip mats.

7. The drip berm of claim 1 wherein said clamp member is co-extensive with said inner berm member.

8. The drip berm of claim 2 wherein said at least one first male mating member, said at least one first female receiver, said at least one second male mating member, and said at least one second female receiver are each co-extensive spaced arrays of said male mating members and female receivers.

9. The drip berm of claim 3 wherein said dove-tail shaped male members are co-extensive spaced arrays of dove-tail shaped male members for forming a continuous dove-tail joint between said inner and outer berm members.

10. The drip berm of claim 4 wherein said clamp member is co-extensive with said inner berm member.

11. The drip berm of claim 5 wherein said at least one first male mating member, said at least one first female receiver, said at least one second male mating member, and said at least one second female receiver are each co-extensive spaced arrays of said male mating members and female receivers.

12. The drip berm of claim 6 wherein said dove-tail shaped male members are co-extensive spaced arrays of dove-tail shaped male members for forming a continuous dove-tail joint between said inner berm member and said outer berm members.

13. The drip berm of claim 1 wherein said inner and outer berm members when mounted to each other form, in lateral cross-section, a smoothly contoured profile rising upwardly from the inner edge of the inner berm member and from the outer edge of the outer berm member.

* * * * *